Patented Nov. 6, 1945

2,388,651

UNITED STATES PATENT OFFICE 2,388,651

RUBBER HYDROCHLORIDE

La Verne E. Cheyney, Akron, Ohio, assignor to Wingfoot Corporation, Akron, Ohio, a corporation of Delaware No Drawing. Application January 24, 1944, Serial No. 519,567

4 Claims. (Cl. 260—771)

This invention relates to the production of rubber hydrochloride and, more particularly, to catalyzing the hydrochlorination of a rubber solution. The catalyzer is or is present in a petroleum refinery sludge of a low degree of unsaturation, having the empirical formula $(C_4H_3)_n$ where $n$ varies from about 5 to about 50, and preferably from about 8 to about 25. A preferred material is that known as Naftolen, which is sold by the Wilmington Chemical Corporation. It is obtained from petroleum refinery sludges and is available in a number of viscosity types, ranging from liquids to resinous materials. Chemically, it is classified as a polymerization or cyclization product of the hydrocarbon structure found in the original petroleum. The material has an iodine number between about 40 and 60. It reacts with about 5 per cent of sulfur and can be covulcanized with rubber. It is distinguishable from the usual mineral-oil hydrocarbons by the fact that it is soluble in aniline, acetone, and concentrated sulfuric acid. Its distillation range is 150 to 380° C. at 12 mm. pressure. Other properties and uses of this type of material are given in United States Patents 2,180,367, 2,185,951, 2,185,952, 2,217,918, and 2,217,919; articles in the following numbers of India Rubber World: August 1941—page 47; September 1942—page 473; November 1942—page 163; and also on page 27 of Rubber Age (New York) for April 1942, and in Modern Plastics for April 1942. It is listed in Plastics Catalog for 1943.

When a significant quantity of this hydrocarbon mixture is added to a solution of rubber in an aromatic hydrocarbon which is to be hydrochlorinated, and the hydrochlorination is then conducted in the usual manner by bubbling gaseous hydrogen chloride through the mixture, the rate of combination between the rubber and the hydrochloric acid is not significantly altered in the early stages of the reaction, but in the latter part the familiar ripening reaction is practically eliminated. This ripening action is explained in Calvert United States Patent 2,139,647. The ripening occurs, for example, in a hydrochlorinated benzene solution of rubber without substantial change in the chlorine content of the rubber. During the ripening, the rubber hydrochloride acquires the desired film-forming properties. This ripening usually requires a period of several hours.

In one example of the process a sample of crepe rubber was milled to a viscosity molecular weight of about 48,000, as calculated by the familiar Staudinger equation. This rubber was dissolved in benzene to form an 8 per cent cement. Then, without adding any catalyzer, the cement was hydrochlorinated by introducing hydrogen chloride gas while maintaining a temperature of 5–10° C. A ripe cement was obtained in about sixteen hours. In another hour the cement started to gel. In another run the same starting material gave a ripe cement in thirteen hours. These results were illustrative of the variations which are obtained with duplicate runs from the same starting rubber.

This same rubber was then employed with varying amounts of Naftolen R-100. The time necessary to ripen the cement to the formation of a gel was markedly reduced. Using 25 parts of Naftolen per 100 parts of rubber, the cement gelled in about six hours. The per cent chlorine in the extracted, gelled product was 30.87. Using 50 parts of Naftolen, the cement gelled in three and a half hours, and the chlorine content of the extracted, gelled product was 30.83 per cent. In the following table the progress of the hydrochlorination in the first of these experiments containing 25 per cent of Naftolen is recorded, and it is compared with the hydrochlorination of the same rubber, using no Naftolen:

*Rate of combination of HCl*

| Cement | Time | Percent Cl in extracted product | Observations |
| --- | --- | --- | --- |
| 25 Naftolen: 100 rubber | 2 hrs. 30 min. | 18.60 | |
| | 3 hrs. 30 min. | 22.73 | |
| | 4 hrs. 30 min. | 25.57 | |
| | 5 hrs. 10 min. | 29.12 | |
| | 5 hrs. 25 min. | 30.12 | Unripe film. |
| | 6 hrs. | 30.98 | Ripe film, cement gelled. |
| Control run | 4 hrs. | 22.18 | |
| | 6 hrs. | 24.15 | |
| | 8 hrs. | 27.90 | |
| | 12 hrs. | 30.93 | Unripe film. |
| | 14 hrs. | 31.13 | Do. |
| | 16 hrs. | 30.93 | Ripe film. |
| | 17 hrs. | 30.97 | Cement started to gel. |

The fact that on extraction the rubber hydrochloride has the same chlorine content with and without the use of Naftolen is an indication that the effect of the Naftolen is catalytic rather than involving any interaction with the rubber or the rubber hydrochloride. It is particularly to be noted that in the control run the maximum combination of HCl has occurred several hours before the film is strippable (designated in the table as "ripe film") or the cement gels. In the Naftolen-containing reaction, however, the cement ripens and gels within an hour after the maximum combination of HCl has occurred. The designations "unripe film" and "ripe film" in the right-hand column indicate the type of film which is obtained when the cement in question is spread on the casting surface and the solvent is evaporated, as described in the above reference.

Although the indications are that it is the Naftolen itself which exercises the catalyzing effect, it is not improbable that the catalytic effect is due to some constituent of the Naftolen or to some fraction of it or to some other part, less than the whole. Therefore, in the claims the catalyst is referred to as being contained in the Naftolen.

What I claim is:

1. The process of hydrochlorinating rubber in solution in an aromatic hydrocarbon to a chlorine content of about 30 per cent and catalyzing the system, thereby hastening the hydrochlorination and reducing or eliminating the ripening period, which comprises passing hydrogen chloride gas into the rubber in a solution which contains Naftolen in which there is present a catalyst in an amount sufficient for catalysis, Naftolen being a cyclized hydrocarbon having the empirical formula $(C_4H_3)_n$ where $n$ varies from about 5 to about 50, and which is obtained from petroleum refinery sludges and is soluble in aniline, acetone, and concentrated sulfuric acid.

2. The process of hydrochlorinating rubber in solution in an aromatic hydrocarbon to a chlorine content of about 30 per cent and catalyzing the system, thereby hastening the hydrochlorination and reducing or eliminating the ripening period, which comprises passing hydrogen chloride gas into the rubber in a solution which contains Naftolen in which there is present a catalyst in an amount sufficient for catalysis, Naftolen being a cyclized hydrocarbon having the empirical formula $(C_4H_3)_n$ where $n$ is from about 8 to about 25, and which is obtained from petroleum refinery sludges, is soluble in aniline, acetone, and concentrated sulfuric acid and distills within the range of 150 to 380° C. at 12 mm. pressure.

3. The process of hydrochlorinating rubber in solution in benzene to a chlorine content of about 30 per cent and catalyzing the system, thereby hastening the hydrochlorination and reducing or eliminating the ripening period, which comprises passing hydrogen chloride gas into the rubber in solution in benzene which contains Naftolen in which there is present a catalyst in an amount sufficient for catalysis, Naftolen being a cyclized hydrocarbon having the empirical formula $$(C_4H_3)_n$$

where $n$ varies from about 5 to about 50, and which is obtained from petroleum refinery sludges and is soluble in aniline, acetone, and concentrated sulfuric acid.

4. The process of hydrochlorinating rubber in solution in benzene to a chlorine content of about 30 per cent and reducing or eliminating the ripening period, which comprises passing hydrogen chloride gas into the rubber in solution in benzene which contains Naftolen in which there is present a catalyst in an amount sufficient for catalysis, Naftolen being a cyclized hydrocarbon having the empirical formula $(C_4H_3)_n$ where $n$ is from about 8 to about 25, and which is obtained from petroleum refinery sludges, is soluble in aniline, acetone, and concentrated sulfuric acid and distills within the range of 150 to 380° C. at 12 mm. pressure.

LA VERNE E. CHEYNEY.